INVENTOR.
Wayne A. Proell
BY
ATTORNEY

United States Patent Office 3,102,386
Patented Sept. 3, 1963

3,102,386
DISCHARGE PRESSURE CONTROLLED GAS GENERATORS
Wayne A. Proell, Chicago, Ill., assignor to Standard Oil Company, Chicago, Ill., a corporation of Indiana
Filed Sept. 26, 1958, Ser. No. 765,697
4 Claims. (Cl. 60—35.6)

This invention relates to gas generators and particularly solid propellant fueled rocket motors.

Events of the past year have forcibly brought to the attention of workers in the rocket propulsion field that large liquid fueled rockets have serious disadvantages; the most serious disadvantage being in the time needed to attain ready-to-fire point after initial warning. Furthermore, the large number of publicized failures has forced the full realization of the need for simplification in order to have a true immediate retaliation potential. The main interest of workers in the missile field is now turned to solid propellant fueled missiles. This interest is primarily due to the essentially immediate state of readiness permitted by solid propellant rockets. Secondarily, the simplicity of the hardware reduces the margin of error due to mechanical malfunctions.

Unfortunately, solid propellants have their drawbacks also. These drawbacks increase as the size of the rocket motor increases. For short-range missiles, these drawbacks can be discounted or overcome by simple methods. In the case of the missiles operating over hundreds of miles of range, hitting the target is a more difficult problem with the present day solid propellant rockets than with liquid propellant rockets. The big problem in large-scale solid propellant rocketry is uniform pressure within the rocket rotor.

The larger the solid propellant grain, the more difficult it is to have a truly homogeneous body. Lack of homogeneity results in deviations from the desired gas product rate with consequent deviation in pressure from the pre-selected pressure, which pre-selected pressure was used in the calculations aiming the missile at its target. Furthermore, it is extremely difficult to determine a grain geometry—even though absolutely homogeneous—which will give a completely constant pressure within the motor throughout the entire burning time. It is normal for solid propellant motors to burn either with slightly increasing pressures or decreasing pressures.

The presently known techniques for controlling large rocket motors which are solid propellant fueled are either so complicated as to be impractical for reliable missile use or so bulky that size advantage of the solid propellant missiles are sacrificed.

An object of the invention is a method for sustaining pressure within a gas generator at essentially the pre-selected pressure of operation. Another object is a method of operating large rocket motors with a combustion chamber pressure sustained at essentially the pre-selected pressure throughout the burning time. A further object is a method of operating a gas generator at a sustained pre-selected pressure, which pre-selected pressure is deliberately varied in accordance with a pre-selected program, said program being either a constant gradual change or one or more abrupt changes in pressure of operation. A further object is a method of operating of a large size solid propellant fueled motor at essentially a pre-selected pressure throughout the burning time of said motor. Yet another object is an apparatus adapted for generating gas at a sustained pre-selected elevated pressure. Still another object is a rocket solid propellant fueled which is operable at a pre-selected pressure for the duration of the burning of said solid propellant. Other objects with respect to both method and apparatus will become apparent in the course of the detailed description.

FIGURE 1 sets out a simplified schematic presentation of one embodiment of an apparatus utilizing the method set out herein.

FIGURE 2 sets out a two-stage rocket missile utilizing apparatus and method of the invention for pressure sustaining.

In the method of the invention, a pre-selected elevated pressure is sustained in the combustion chamber of a gas generator, which generator is susceptible to deviation toward pressures from said pre-selected pressure; the method comprises introducing gas into said combustion chamber, which gas has been developed in another gas generator; this gas is introduced in response to deviation in pressure in said chamber and in amounts such that the deviation in pressure is overcome and the chamber returned to the pre-selected pressure.

The method and one embodiment of apparatus suitable for the practice thereof is described in connection with FIGURE 1. It is to be understood that the embodiment of FIGURE 1 is not limiting and other embodiments may be readily devised by those workers in this art.

Figure 1:
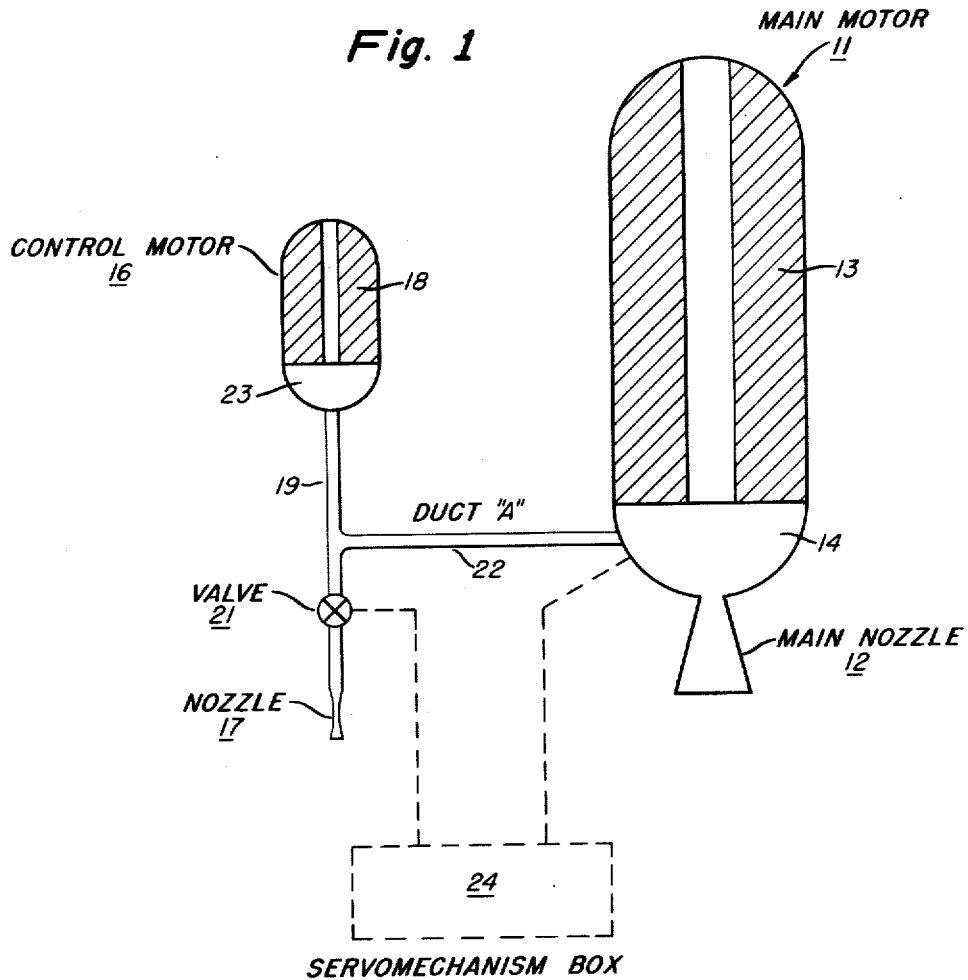

In FIGURE 1 there is set out in very elementary fashion, the propulsion units of a large size solid propellant fueled rocket. The main motor 11 is provided with a gas discharge nozzle 12. Motor 11 is solid propellant fueled, which fuel is indicated by the cross-hatching 13. As fuel 13 burns, the gases are discharged (emitted) from combustion chamber 14 by way of nozzle 12. Motor 11 operates at elevated pressures which are defined as from approximately 100 p.s.i. and above, and more usually between about 500 and 1500 p.s.i.

A control motor 16 is provided with gas discharge nozzle 17. Motor 16 is also solid propellant fueled with fuel 18. Motor 16 is provided with conduit 19 and valve means 21.

Conduit 22 permits free communication between combustion chamber 23 of motor 16 and combustion chamber 14 of motor 11. (It is to be understood that in these solid propellant motors, the combustion chamber amounts to the gas space not occupied by propellant.) Conduit 22, in this embodiment, connects conduit 19 and combustion chamber 14. It is to be understood that conduit 22 may just as well connect directly combustion chamber 23 of motor 16 and chamber 14 of motor 11. It is essential that conduit 22 permit free communication between the combustion chambers of the two motors. The term "free communication" is intended to mean communication which is not subject to voluntary control once said motors are operating; a valve might be positioned in conduit 22, which valve is pre-set before firing the motors, or a check-valve might be placed in conduit 22 to prevent flow of gases from chamber 14 to conduit 19.

Valve 21 is provided with a positioning means not shown, which permits the setting of valve 21 to be varied during the burning time of the motors. The burning time of motor 16 and motor 11 is essentially identical. The setting of valve 21 is in response to variation in pressure in chamber 14 from a pre-selected pressure. The deviation in pressure chamber 14 in the embodiment is towards pressures lower than the pre-selected pressure. Servomechanism box 24 sets out schematically a means for sensing pressure deviations in chamber 14 and determining the change in setting of valve 21 needed to control flow of gas through orifice 17, by the actuation of positioning means for obtaining the desired setting of valve 21, whereby gas is introduced by way of conduit 22 into chamber 14 in amounts such that the deviation in pressure is overcome and the rocket motors are once again at the desired pre-selected pressure.

The method of the invention is applicable to systems wherein solid propellant fuel 13 and solid propellant fuel 18 are the same. However, the method is particularly suitable for sustaining pressure in a system utilizing a high energy solid propellant fuel. Examples of high energy solid propellant fuels are double-base propellants, ammonium perchlorate and ammonium chlorate propellant. The high energy fuels produce gases and emit these gases from the gas chamber at temperatures in excess of 2000° F., for example, a double-base propellant produces gases having a temperature on the order of 6000° F.; in general, the high energy fuels produce gas having temperatures on the order of 3000° F. and 7000° F. It is readily apparent that, at these temperatures, the problems of materials of construction are many. It is very desirable that positioning valve 21 be made of light weight and cheap material, which condition is obtainable only with relatively low temperature gas flowing through said valve 21. Solid propellant compositions are now known which produce gas at a temperature below 2000° F., for example, 1800° F. and even as low as 1300° F. Gas at temperatures below 2000° F. is readily handled at a reasonable cost and therefore it is preferred that the control motor operate with a solid propellant producing a gas having a temperature below 2000° F. One example of such a solid propellant consists of ammonium nitrate, using as a binder a mixture of cellulose acetate, triethylcitrate, dinitrophenoxy ethanol, carbon black, and an organic catalyst; this composition has a measured gas temperature of about 1700° F.

One embodiment of the method of the invention is described in connection with FIGURE 1. The pre-selected pressure for operation in this instance, of a large missile utilizing solid propellant fuel, is 1000 p.s.i. The main motor is driven by a high energy solid propellant utilizing ammonium perchlorate as the oxidizer. The control motor, which contains about 10% of the total weight of propellant, is fueled with an ammonium nitrate solid propellant. Valve 21 is set at about the half-open position in order to permit a pressure control of about 15% on either side of the pre-selected pressure. The servomechanism governing the setting of valve 21 is adjusted to respond to pressure changes as small as 5 p.s.i. in the combustion chamber of the main motor. At firing time, both motors are ignited simultaneously, with discharge gases passing out of both nozzles 12 and 17. In some cases, it may be desirable to close valve 21 at takeoff to produce a temporary pressure in motor 14 higher than pre-selected, in order to obtain the additional thrust to overcome the initial inertia of the missile. After the missile has attained flight, variations in pressure in chamber 14 are overcome by changes in the setting of valve 21. For example, should the pressure in chamber 14 increase above the pre-selected pressure of 1000 p.s.i., the control mechanism 24 will open valve 21 permitting additional gas to pass out of control nozzle 17, thereby decreasing the amount of gas passing by way of conduit 22 into chamber 14; the setting of valve 21 is such that the deviation from pre-selected pressure is overcome and chamber 14 returns to the desired 1000 p.s.i. On the other hand, when pressure in chamber 14 decreases below the pre-selected pressure, the control mechanism 24 closes valve 21 sufficiently so that enough additional gas passes through conduit 22 into chamber 14 to overcome the deviation from the pre-selected pressure.

It is to be understood that the method of the invention is not limited to operating with solid propellant rocket motors. Broadly, the method is applicable to any gas generator which is desired to be operated at a pre-selected pressure and which is particularly susceptible to deviation toward pressures below said pre-selected pressure. To illustrate: the gas generator may be a fixed unit fueled with solid propellant with the gas used to drive a turbine or some other operation requiring a very uniform pressure. Or, the gas generator may be fueled with liquid monopropellant or bipropellant and instead of controlling pressure by varying the amount of fuel per unit time, the fuel input may be constant and the method of this invention used to control the pressure—this procedure with liquid fuel may be used either on stationary gas generators or rocket motors. Or, the method may be applied to a gas generator using fuel gas such as methane and air or oxygen, whereby the need for precise control of gas and oxygen pressure is obviated.

The method of the invention is applicable not only to sustaining gas generator pressure at a pre-selected constant pressure, but may be used to program the pressure. To illustrate: the controller mechanism may be adjusted so that the pressure in the combustion chamber builds up at a uniform rate during the burning time; or decreases at a uniform rate during the burning time. The pressure may be changed to provide for one or more plateaus of constant sustained pressure with these plateaus being automatically set in accordance with a pre-selected program placed into the mechanism prior to initiating burning of the motors.

It is indicated that in large-scale rocket motors such as are used in IRBM and ICBM, an entirely practical and simple control of pressure deviation varying up to about 35% from pre-selected pressure is obtainable. Larger deviations may be provided for by changing the relative sizes of the main motor(s) and the control motor(s). It is indicated that this wide margin of pressure control up to about 35% deviation is attainable by having between about 5–10% of the total weight of propellant in the missile motor(s) placed in the control motor. It is further indicated that a total saving in weight of the missile ranging from about 7–13% is attainable owing to elimination of safety factors on propellant weight and motor wall thickness because of the essentially constant pressure operation provided by the method of the invention.

Figure 2:
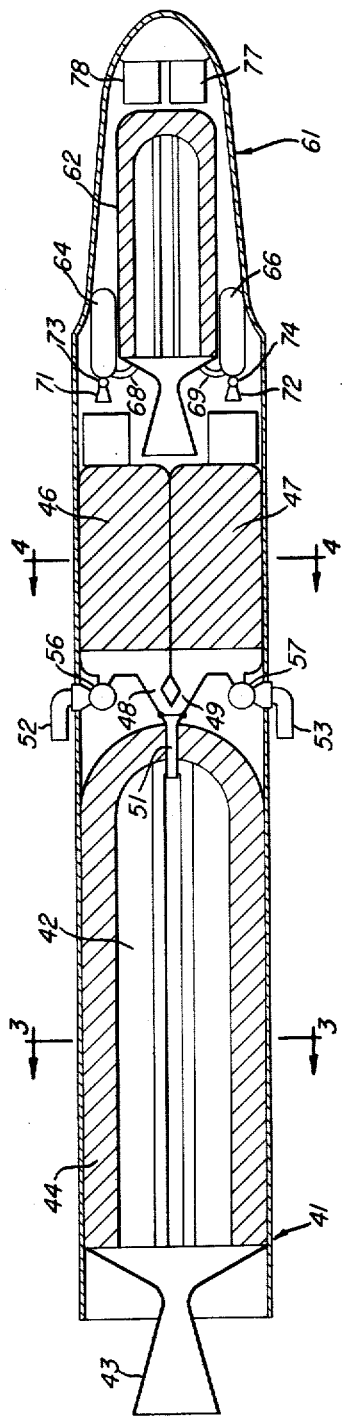
Figure 3:
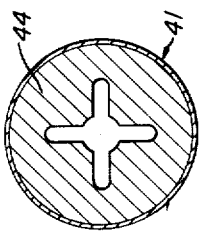
FIGURE 3 is a cross-sectional view at 3—3 of FIGURE 2.

FIGURE 2 shows schematically a more sophisticated apparatus set up in a two-stage missile. The first stage 41 of the missile is provided with motor 42, nozzle 43 and solid propellant 44. The solid propellant 44 is a high energy fuel utilizing ammonium perchlorate oxidizer. The solid propellant 44 is cast as a four-pointed star as shown in FIGURE 3.

Figure 4:
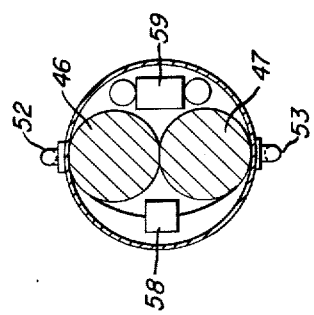
FIGURE 4 is a cross-sectional view at 4—4 of FIGURE 2.

In FIGURE 2, two control motors, 46 and 47, are utilized. These are positioned in front of motor 42. Motors 46 and 47 are provided with conduits 48 and 49, respectively, which join into a single conduit 51, which leads gases from motors 46 and 47 within motor 42. Motors 46 and 47 are provided with gas discharge nozzles 52 and 53, respectively. Also, motors 46 and 47 are provided with valves 56 and 57, respectively. Valves 56 and 57, respectively, are set by positioning means not shown in response to instructions from servomechanism box 58, which responds to deviations in pressure from the pre-selected pressure occurring in motor 42. The first stage 41 of FIGURE 2 also contains an auxiliary power unit (APU) 59. A sectional view through plane 4—4 of the first stage 41 showing the servomechanism box 58 and APU 59 is set out in FIGURE 4.

In this embodiment the control motors operate with a low temperature ammonium nitrate solid propellant providing a gas temperature of about 1700° F.

The second stage 61 of the missile of FIGURE 2 is provided with motor 62 and nozzle 63. In stage 2, two control motors 64 and 66, respectively, are used. Conduits 68 and 69 connect the combustion chambers of motor 62 and motors 64 and 66. Motors 64 and 66 are provided with gas discharge nozzles 71 and 72, respectively, and control valves 73 and 74, respectively. Valves 73 and 74 are set in response to signals to servomechanism 77, which responds to deviation in pressure in motor 62. Second stage 62 is provided with APU 78.

It can be readily seen from FIGURE 2 the extreme simplicity of the propulsion system of the missile as compared with that of a liquid propellant fueled missile of the same range.

The above description is particularly pertinent to motors having very long burning times, where deviations occur owing to grain geometry, etc. Another problem exists owing to variation in grain temperature from a fixed standard temperature which has been placed in the guidance system of a missile; grain temperature determines motor pressure in the absence of a control system. The method and apparatus of the invention are very suitable for such situations. Instead of an elaborate system of keeping the missile at the standard temperature, the method of the invention is applied and the setting of the valve means (21 in FIGURE 1) is determined by the ambient temperature of the grain at firing time. The setting of the valve may be calibrated in a temperature chart and the operator merely sets the controller to ambient temperature point. This technique gives excellent pressure control in short duration motors or may be used to give a semi-refined, but cheap, control on long duration motors.

The main motor pressure control system described herein has been denominated "Pneumokratic Control System."

Thus having described the invention, what is claimed is:

1. A rocket comprising a main motor provided with a gas discharge nozzle, said main motor being provided with a solid propellant fuel producing gas at pre-selected elevated pressure and a temperature in excess of 2000° F., a control motor provided with a gas discharge nozzle, said control motor being provided with a solid propellant fuel producing gas at elevated pressure and a temperature below 2000° F.; conduit means permitting continuous free flow of gases between said motors; valve means positioned and adapted for controlling the flow of gas through said nozzle of said control motor; pressure responsive means adapted for setting said valve means in response to pressure deviation in said main motor from said pre-selected pressure, so as to overcome the deviation from said pre-selected pressure.

2. The rocket of claim 1 wherein said solid fuel in said main motor is about 90–95% of the total weight of solid fuel in said motors.

3. An apparatus adapted for the emission of gas at a sustained pre-selected elevated pressure by burning gas-affording materials at a fixed rate determined by the properties of said materials, which apparatus comprises a single main gas generator provided with a combustion chamber wherein gas is producible at a pre-selected elevated pressure, said pressure being susceptible to deviation toward pressure away from said pre-selected pressure, and a gas discharge conduit means for passage of gas from said main chamber; a control gas generator provided with a combustion chamber wherein gas is producible at elevated pressure and control conduit means for exit of gas from the chamber of said control generator; connecting conduit means continuously and freely communicating with the gas space within said two combustion chambers; a valve means, provided with a positioning means, placed in said exit conduit means from said control generator adapted for controlling the flow of gas through said control conduit means, and a control means responsive to deviation in pressure in said main chamber and adapted for the activation of said positioning means to adjust said valve to the setting required to overcome the deviation from said pre-selected pressure.

4. The apparatus of claim 3 wherein said main gas generator is solid propellant fueled and the gas produced therein is emitted at a temperature in excess of 2000° F. and said control gas generator is solid propellant fueled and the gas produced therein is emitted at a temperature below 2000° F.

References Cited in the file of this patent
UNITED STATES PATENTS

| | | |
|---|---|---|
| 2,683,963 | Chandler | July 20, 1954 |
| 2,791,883 | Moore et al. | May 14, 1957 |

UNITED STATES PATENT OFFICE
CERTIFICATE OF CORRECTION

Patent No. 3,102,386                             September 3, 1963

Wayne A. Proell

It is hereby certified that error appears in the above numbered patent requiring correction and that the said Letters Patent should read as corrected below.

Column 2, line 67, after "pressure" insert -- in --.

Signed and sealed this 3rd day of March 1964.

(SEAL)
Attest:
ERNEST W. SWIDER

Attesting Officer

EDWIN L. REYNOLDS

Acting Commissioner of Patents